US010081278B1

(12) United States Patent
Balzer

(10) Patent No.: US 10,081,278 B1
(45) Date of Patent: Sep. 25, 2018

(54) VEHICLE SEAT COVER WITH STOWABLE ARM EGRESS COMPONENT AND EXTENDIBLE FLEXIBLE ARM COVER PORTION

(71) Applicant: Pushpa Khemchand Balzer, Memphis, TN (US)

(72) Inventor: Pushpa Khemchand Balzer, Memphis, TN (US)

( * ) Notice: Subject to any disclaimer, the term of this patent is extended or adjusted under 35 U.S.C. 154(b) by 0 days.

(21) Appl. No.: 15/691,769

(22) Filed: Aug. 31, 2017

(51) Int. Cl.
*B60N 2/60* (2006.01)
*B60N 2/75* (2018.01)
*A47C 7/62* (2006.01)

(52) U.S. Cl.
CPC ............... *B60N 2/60* (2013.01); *A47C 7/386* (2013.01); *B60N 2/6009* (2013.01); *B60N 2/757* (2018.02)

(58) Field of Classification Search
CPC .......... B60N 2/6009; B60N 2/60; A47C 7/386
USPC ...................................................... 297/229
See application file for complete search history.

(56) References Cited

U.S. PATENT DOCUMENTS

| | | | | |
|---|---|---|---|---|
| 6,676,209 B1* | 1/2004 | Szabo | ............ | B60N 2/60 297/188.01 |
| 7,261,375 B2* | 8/2007 | Godshaw | ............ | A01K 1/0272 119/28.5 |
| 8,465,093 B2* | 6/2013 | Janowski | ............ | B60N 2/6018 297/180.11 |
| 9,010,856 B2* | 4/2015 | Krankkala | ............ | B60N 2/60 297/219.1 |
| 9,610,877 B2* | 4/2017 | Umlauf | ............ | B60N 2/90 |
| 9,669,742 B1* | 6/2017 | Bailey | ............ | B60N 2/5816 |

* cited by examiner

*Primary Examiner* — Syed A Islam
(74) *Attorney, Agent, or Firm* — William S. Parks

(57) ABSTRACT

A rear seat cover article including a portion that allows for a stowable seat arm to pass through and completely cover with full coverage of all points on the rear seat simultaneously is provided. Such an article includes a versatile middle access panel with a stowed inner cover that unfolds on demand to provide coverage of the subject extended seat arm as well as possible draping downward or fitting around the lower edges of such an arm. The overall configuration includes a complete middle panel to fold from the rear back portion to place on the seat portion, thereby allowing for the seat arm to be unstowed to full extension. The middle panel then returns to its original position with a middle opening provided for the arm to extend through. A middle flap then unfolds and extends to provide top cover and at least side cover for the unstowed arm.

1 Claim, 9 Drawing Sheets

VEHICLE SEAT COVER WITH STOWABLE ARM EGRESS COMPONENT AND EXTENDIBLE FLEXIBLE ARM COVER PORTION

FIELD OF THE INVENTION

The present invention pertains to a rear seat cover article including a portion that allows for a stowable seat arm to pass through and completely cover with full coverage of all points on the rear seat simultaneously. Such an article thus includes a versatile middle access panel with a stowed inner cover that unfolds on demand to provide coverage of the subject extended seat arm as well as possible draping downward or fitting around the lower edges of such an arm. To accomplish this result, the overall configuration was provided wherein a complete middle panel may be manipulated to fold from the rear back portion to place on the seat portion, thereby allowing for the seat arm to be unstowed to full extension. The middle panel then can be raised to its original status but with a middle opening provided for the arm to extend through. A middle flap at such an opening then unfolds and extends to provide top cover and at least side cover for the unstowed arm.

BACKGROUND OF THE PRIOR ART

Vehicles are used to transport myriad articles, animals, groceries, the list is endless. Individuals have long taken pride in their vehicles and the aesthetic qualities thereof, particularly as it concerns the interior. As such, covers have been provided as protection for vehicle seating, whether to prevent damage from sharp edged articles, pet concerns (whether from hair, saliva, excrement, etc.), spills from beverages and other liquids, again, the list goes on.

There has thus long been a market to provide different types of seat covers to meet these needs and wants of vehicle-driving and owning consumers. Of one particularly popular type of cover is a rear seat or bench type that allows for both seat and back cushion coverage, ostensibly to protect the fabric, leather, vinyl, or other type of seat upholstery from damage, stains, etc. Additionally, seat and/or bench covers (primarily for rear seats and/or benches of vehicles, such as SUVs, minivans, trucks, and the like) have also been provided with hammock-like front panels that can attach to a forward seat or seat array. Such hammock-like structures basically protect the vehicle floor and front seat from damage, stains, pet hair, etc., as well as acting as a barrier to, if needed, pet movement from the rear to the front of the vehicle. Complete coverage of such a seat and/or bench structure is possible with such a complete flat seat cover article. If all seats and/or benches remained as a static flat configuration, such would be acceptable in total within the industry.

However, the typical rear seat and/or bench structure now includes a mid-situated stowable armrest/drink holder component that has not been taken fully into consideration for protection purposes. Certainly, there exist some seat covers that include a manipulatable middle panel to allow for access and unstowing of the armrest, etc., type of component noted above. However, such configurations generally limit protection to the underlying seat and not the arm and certainly not the open seat portion (recess, for instance) from which the armrest is unstowed when in use. Thus, there is nothing provided within this industry that accords desirable coverage of the entirety of the seat back, armrest stowage recess, and armrest in total. The only other possible design in the market include a bottom provided fitted fabric to surround the bottom and outer edges of such an armrest in unstowed status. This configuration, unfortunately, leaves the top of such an armrest and the remaining components of the seat back and recess completely open and unprotected. Thus, in terms of prior attempts to possibly allow for armrest destowing (and thus utilization in tandem with such a seat cover) either create situations where damage staining, etc., may easily be imparted to unprotected seat back portions and/or the armrest (and/or recess) itself, or wherein a limited amount of protection is provided to the armrest when unstowed and partially covered.

There thus remains a need to provide the industry with a complete coverage capability, particularly with easy-to-access and utilize component panels and/or parts for protection of rear seat and/or bench articles and/or arrays. To date, as noted above, there has not been any disclosure provided the industry to meet such a desirable end result.

Advantages and Brief Summary of the Invention

One distinct advantage of the present invention is the capability of selecting different configurations for seat coverage in relation to the panels present therein. Another advantage is the ability to completely cover an unstowed armrest and the remainder of the subject seat and/or bench during such utilization. The further ability to choose to utilize a connectable hammock-like portion is yet another advantage of this invention. Yet another advantage is the provision of a cushion-like armrest cover component when not deployed and thus as a middle seat back cover.

Accordingly, this invention encompasses a vehicle seat cover comprising a flexible sheet to cover a full rear seat or bench of a vehicle, wherein said flexible sheet includes a top edge, a bottom edge, and two opposing side edges, and a mid-line running from one opposing side edge to another, wherein said mid-line defines a folding edge between a back portion and a sitting platform portion thereof said seat and or bench, said seat cover further including a middle portion, wherein said middle portion comprises a middle panel having opposing and parallel side edges as detachable structures with connectors located at least at said top edge of said seat cover and allowing for said panel to fold downward to lay, at least temporarily, on said sitting platform portion of said seat or bench, said middle panel including a separate internal panel having an exterior face, an internal portion, and an opening portion from one middle panel side edge to the opposing side edge and provided substantially horizontally between said middle panel side edges and at a location above that of said mid-line of said seat cover, wherein said internal panel further includes opposing and parallel detach lines leading from said opening line upward to a set distance within said middle panel, said internal panel also further including a stowable cover component within said internal portion thereof, wherein said stowable cover component unfolds outwardly and from underneath said internal panel when said internal panel is detached from said middle panel in relation to said detach lines, wherein said stowable cover component extends from said internal panel such that said internal panel may be reattached through said detach lines to said middle panel and said middle panel may be reattached to said detachable structures to provide full coverage of said seat or bench when said stowable cover component is present external to said internal panel. Such a seat cover that is utilized to provide coverage to a deployed armrest within said seat or bench with full coverage of the top surface and sides thereof (including, if desired, recessed drink holders), whether in drape or fitted relation thereto, are thus included herein, as well. The method of deploying such a seat cover for such an armrest coverage purpose is also included herein, wherein said middle panel is initially detached and folded downward to said sitting platform of said seat or bench, deploying (destowing) the subject armrest, lifting said middle panel back to its initial attached level, thereby allowing said armrest to pass through the opening within the internal panel, detaching the internal panel to a certain level, at least, raising said internal panel to allow access of the stowable cover component therein and thereunder, unfolding said stowable cover component with a first unfolding act under and outward from said internal panel (such as with an axis of cover component rotation along said opening line) and further accessing a remainder of folded material to provide a cover over the top surface of said armrest and all sides thereof, as well, wherein said cover component may be fitted around said armrest or draped thereover, and wherein said cover component may optionally include recessed areas to accommodate and align with drink holders to provide complete coverage thereof, as well. Such an internal panel stowable cover component may thus be provided as an extra cushioning portion within the middle panel prior to deployment and utilization, according a further benefit to the user. Likewise, the detach lines for both the middle panel and the internal panel may be zippers, hook and loop fasteners (VELCRO, for instance), snaps, and the like (basically any type of connector along a line for both portions). The overall invention thus accords simplicity of utilization with comfort for the user and, most of all, complete coverage even with a deployed armrest in place.

The seat cover is provided with a plurality of straps and releasable connectors for securing the cover to the seat or bench (as well as, if present, the front hammock-like structure to the front seat). The straps are provided with releasable fasteners that cooperate with one another, such as quick release buckles, allowing the front straps to fasten about, for example, the headrest portions of the front seat, or about a handle mounted to the ceiling of the vehicle. The rear straps extend behind the rear seat of the vehicle to secure the base portion to the rear seat.

Further, the cover includes connected sitting platform side sheets that may drape or fit over the subject vehicle seat and slits or openings at the connector line between the seat back covering portion and the sitting platform covering portion to facilitate placement and arrangement for full coverage thereof. With the seat back cover portion, the sitting platform cover portion, the opposing seat side cover portions, and the front hammock-type cover portion, the overall configuration provides a five-sided protective enclosure for the rear seat or bench portion of a target vehicle (not to mention providing potential coverage for the back of a front seat, as well as inner portions of the vehicle doors and walls).

When not in use, the front sheet and the pair of side sheets may be detached from the base sheet and the sheets may be folded, secured to one another, and transported by the user. A carrying bag may thus be provided to facilitate such transport when not in use.

The cover may be made from any standard type of fabric, flexible plastic, and the like, that allows for such a large coverage article. Thus, polyolefin (polyethylene, polypropylene, combinations thereof, etc.), polyamide (nylon, as an example, of any acceptable type), polyester, and the like, may be employed as fibers for the fabric itself. Films may be inserted between layers, if desired, to accord further protections from liquid spills, as well. Additionally, the cover may be coated or otherwise applied with a stain-preventive, stain-release, and other type of chemical for such a purpose.

The cover may be provided as a single article structure or in parts that connect together. The key for this inventive cover is the inclusion of the specifically configured middle panel and internal panel components to accord the armrest deployment and total coverage (armrest and entire rear seat and/or bench) benefit.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The following descriptions and examples are merely representations of potential embodiments of the present disclosure. The scope of such a disclosure and the breadth thereof in terms of claims following below would be well understood by the ordinarily skilled artisan within this area.

Figure 1:
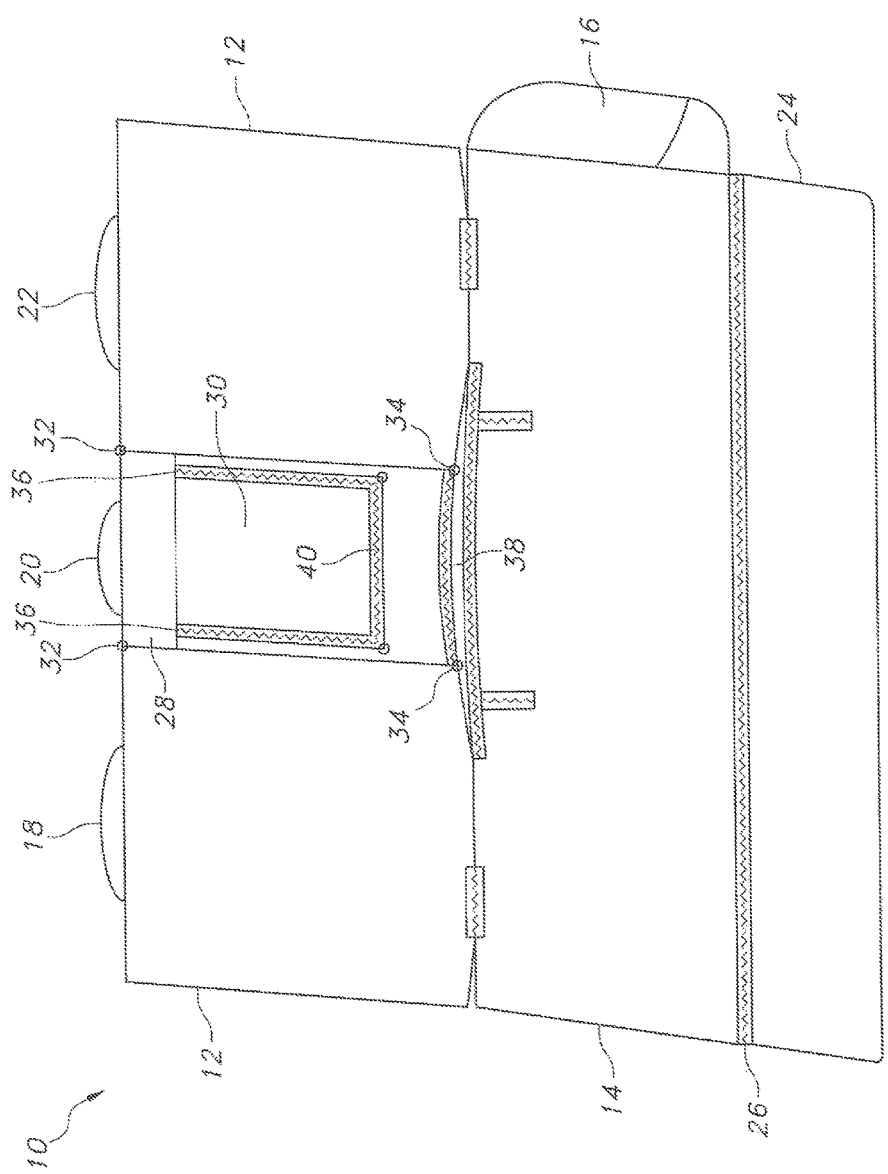
FIG. 1 is an aerial view of one potential embodiment of a seat cover in total of the present invention.

As illustrated in FIG. 1, the vehicle seat cover 10 includes two seat back cover portions 12, a sitting platform cover 14, side sitting platform covers 16, a left seat back connector 18, a middle seat back connector 20, a right seat back connector 22, a removable hammock-type cover portion 24, a hammock-type cover portion connection means 26 (such as a zipper, although hook-loop and other type of connectors may be utilized as well), a middle seat back middle panel 28, a middle panel internal panel 30, opposing middle panel detach line connectors 32, opposing detach line terminal ends 34, opposing internal panel detach points 36, a middle panel bottom edge mid-line 38, and an internal panel opening 40.

Figure 2:
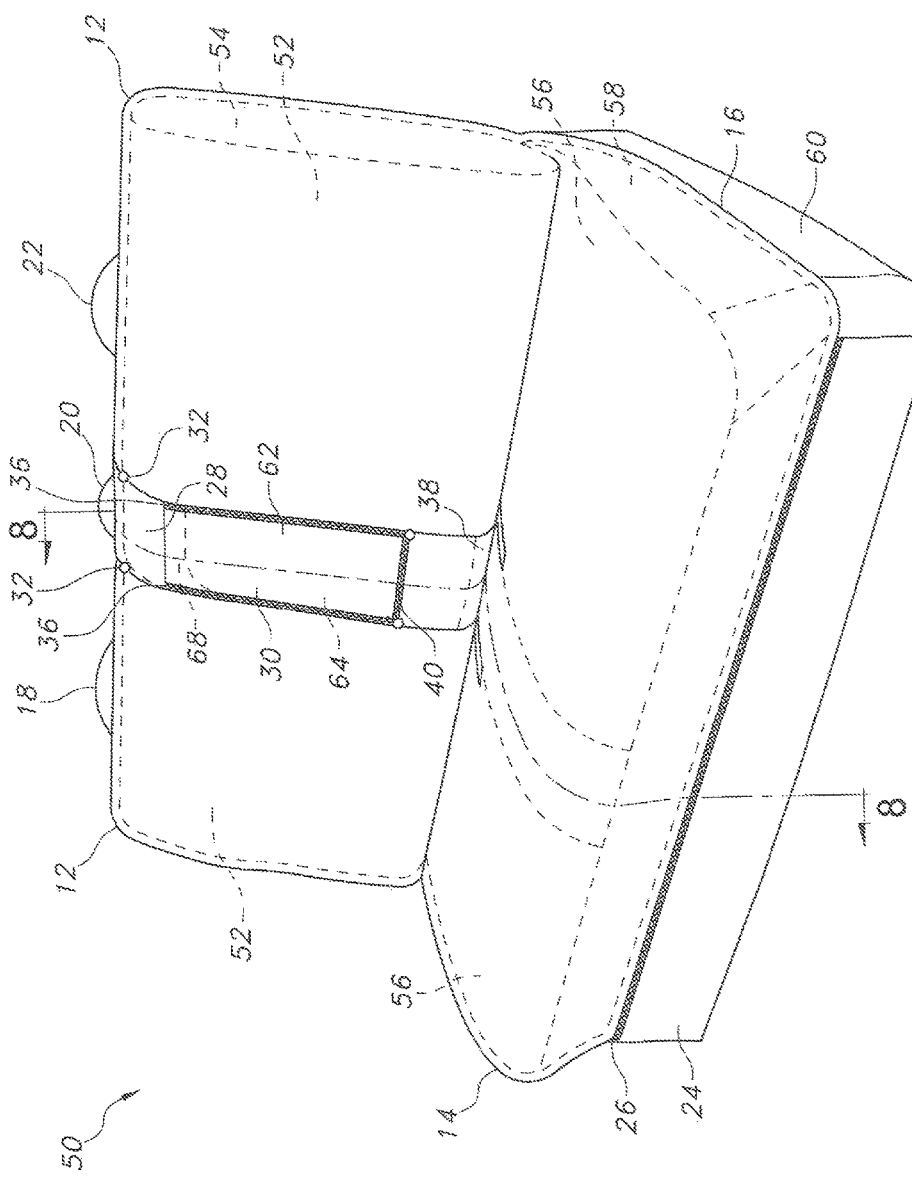
FIG. 2 is a perspective view of vehicle seat (or bench) including a stowed armrest with the vehicle seat cover according to FIG. 1 applied thereover.
Figure 3:
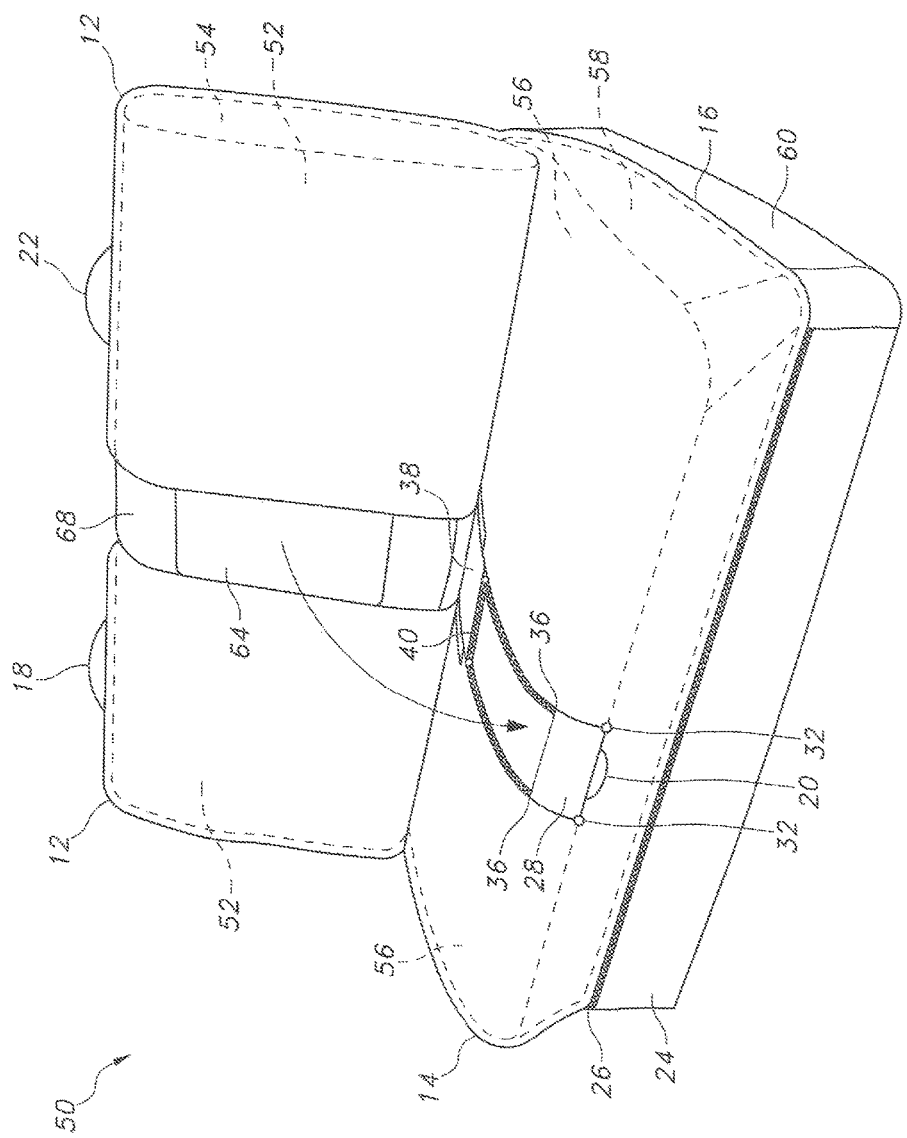
FIG. 3 is a perspective view of the covered seat or bench of FIG. 2 with the middle panel detached and lowered for armrest deployment.
Figure 4:
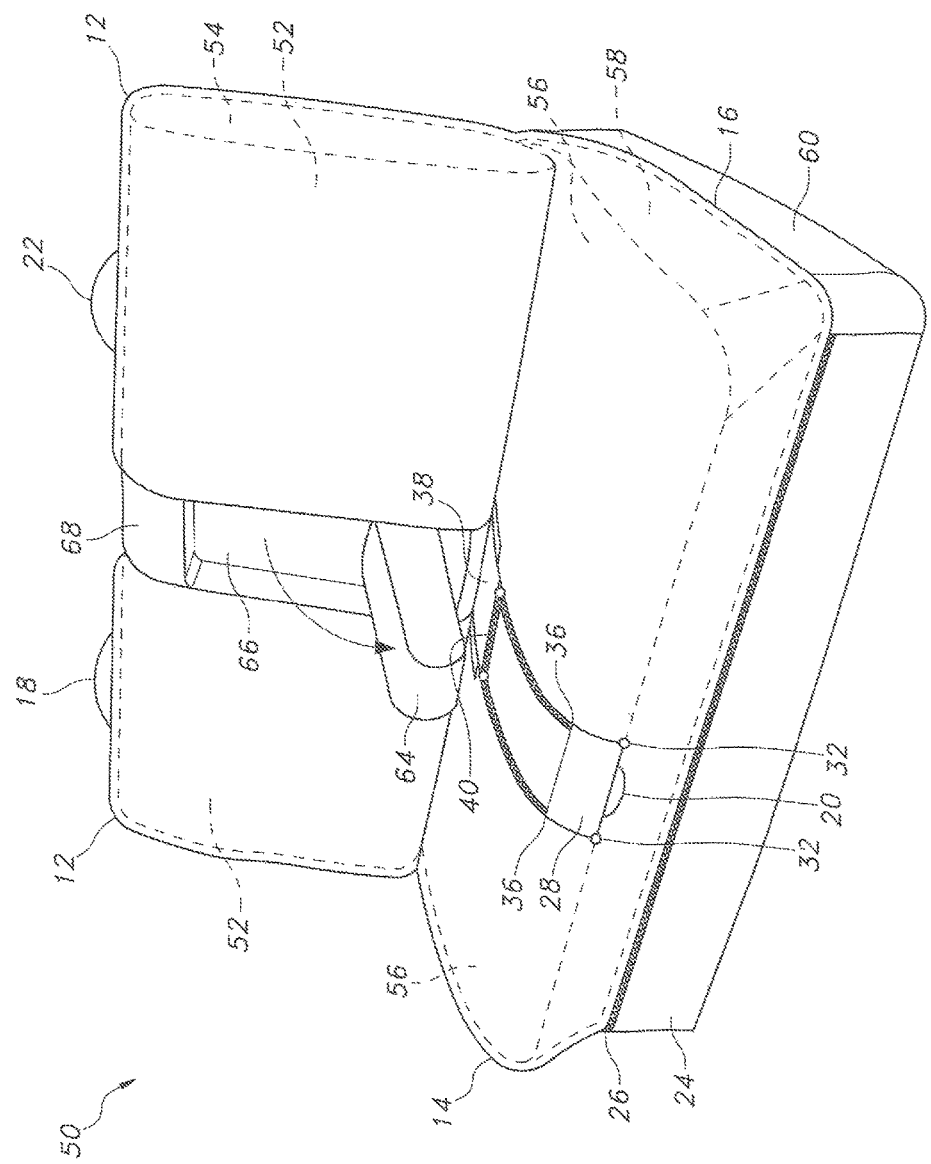
FIG. 4 is a perspective view of the covered seat or bench of FIG. 3 with the armrest deployed.
Figure 5:
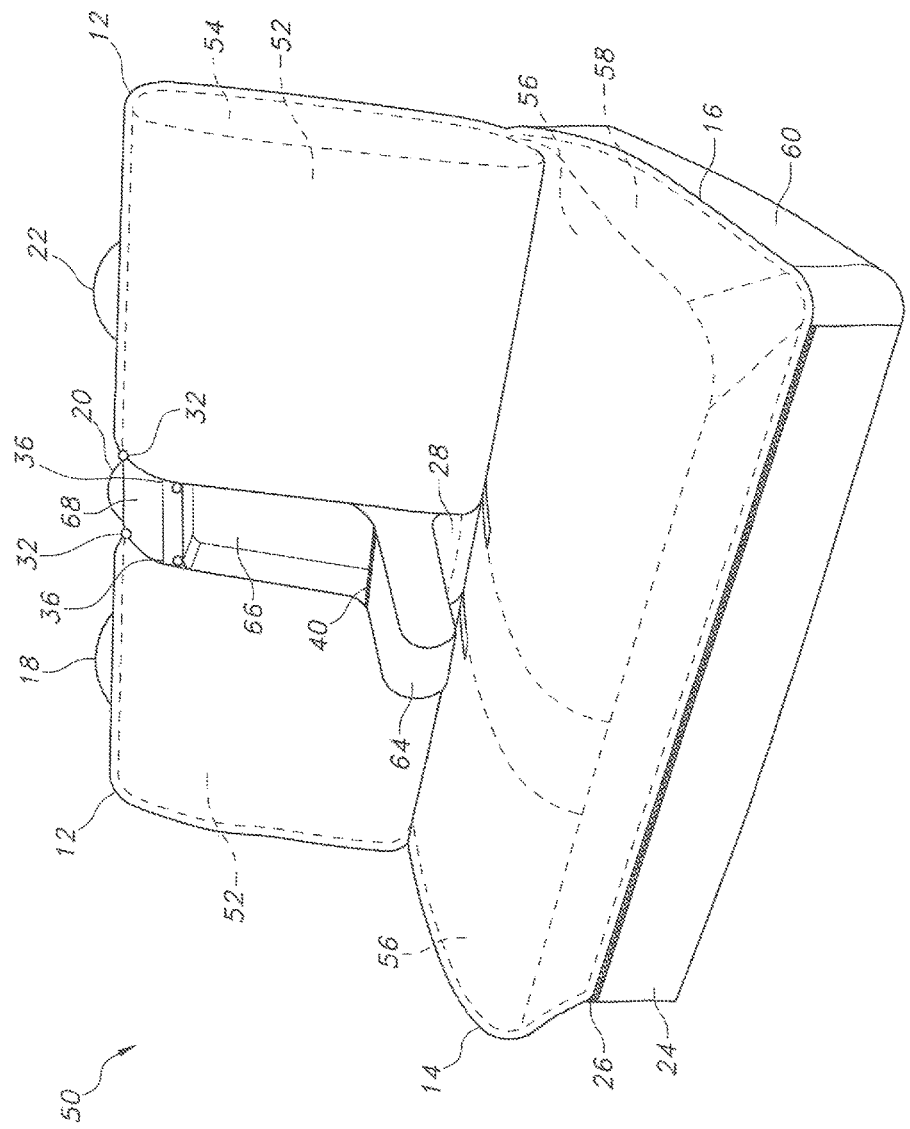
FIG. 5 is a perspective view of the covered seat or bench of FIG. 4 with the middle panel reattached and returned to its original state with the armrest present through the opening of the internal panel.
Figure 6:
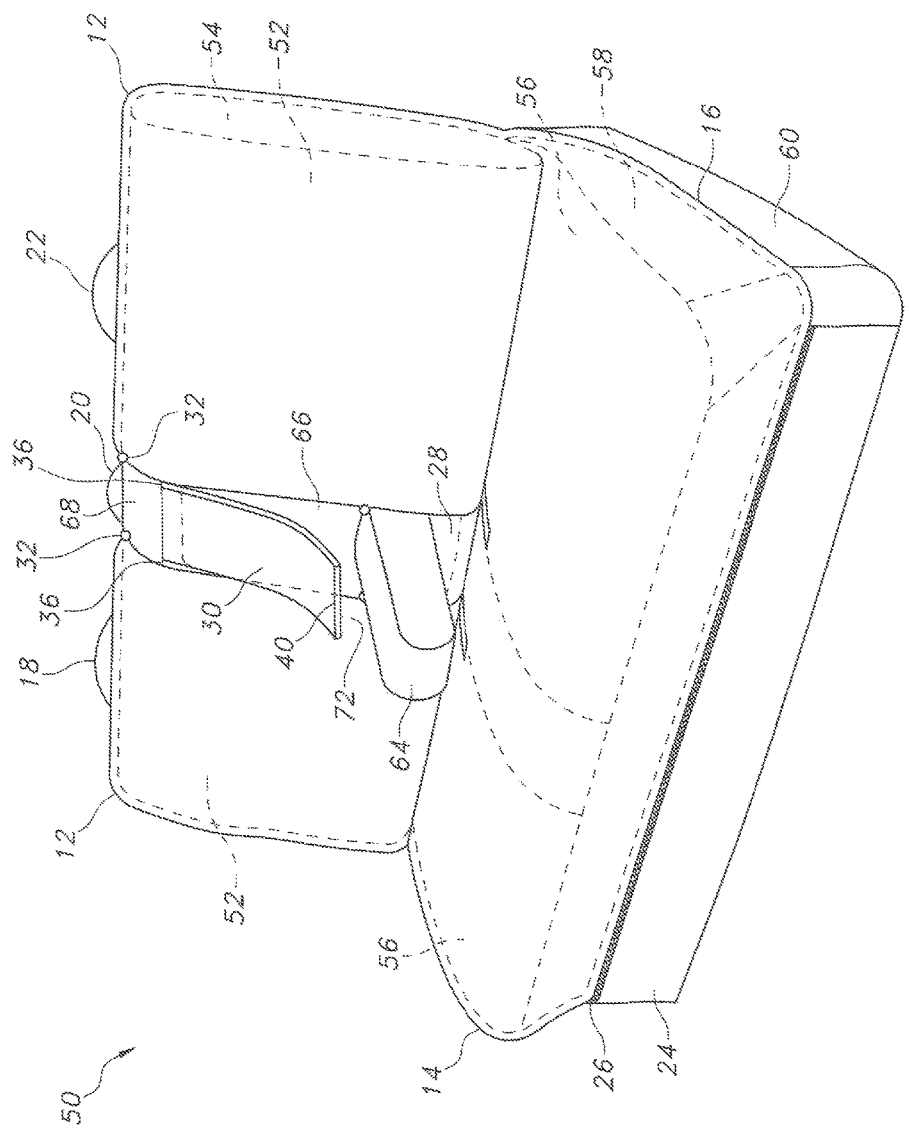
FIG. 6 is a perspective view of the covered seat or bench of FIG. 5 with the internal panel detached and the stowable cover component accessed.
Figure 7:
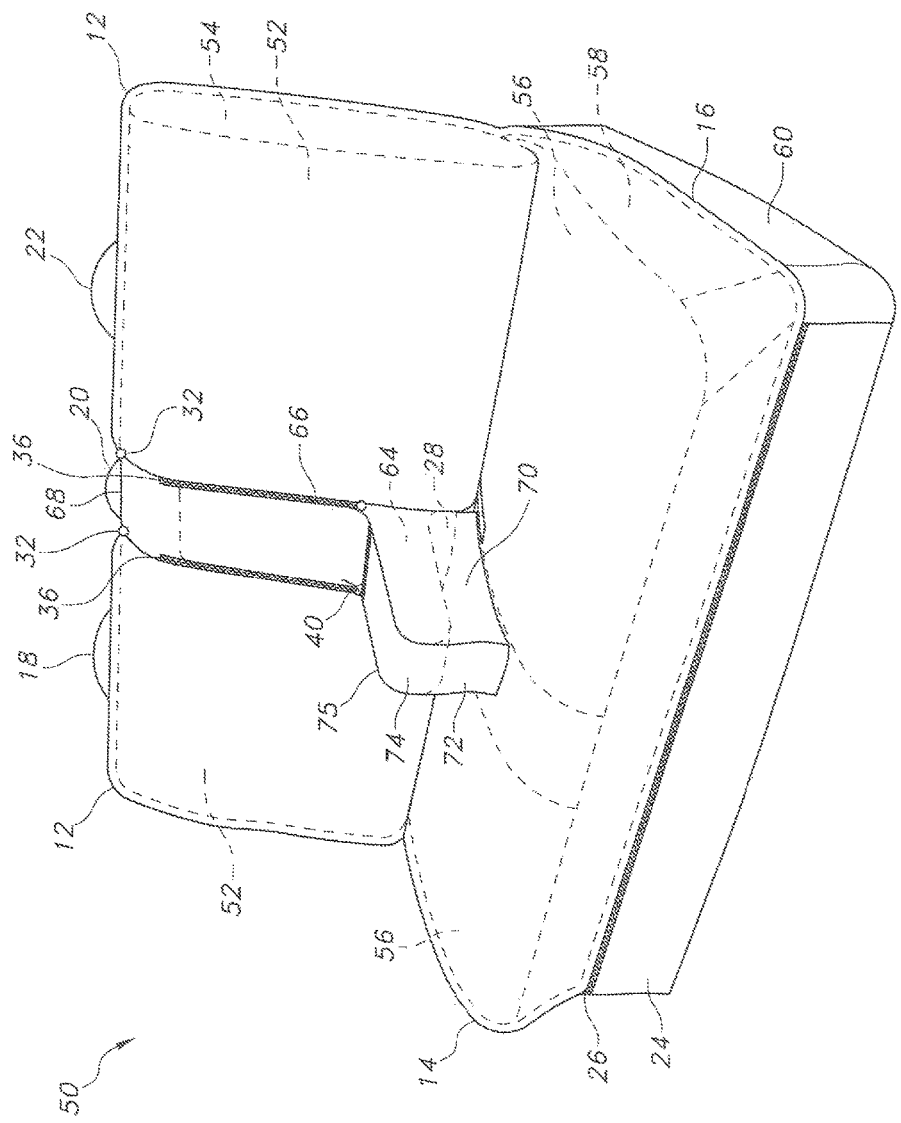
FIG. 7 is a perspective view of the covered seat or bench of FIG. 6 with the internal panel opened up to unfold the stowable cover component over the entirety of the armrest.
Figure 8:
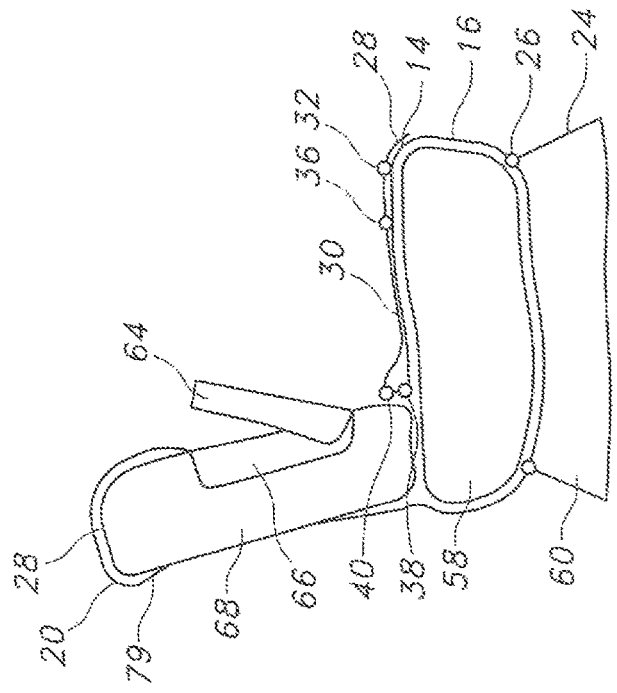
FIG. 8 is a cross-sectional view along line A-A' in FIG. 2.
Figure 9:
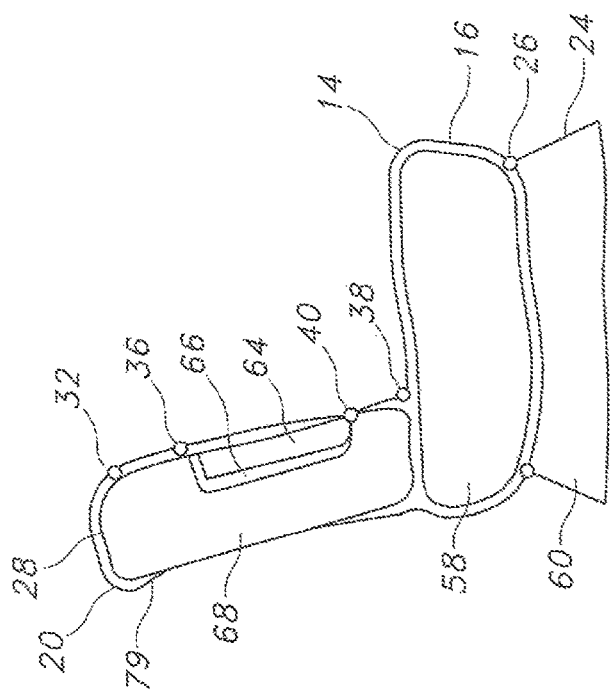
FIG. 9 is a cross-sectional view as in FIG. 8 showing deployment of the armrest and the middle panel maneuvered as in FIG. 3.
Figure 11:
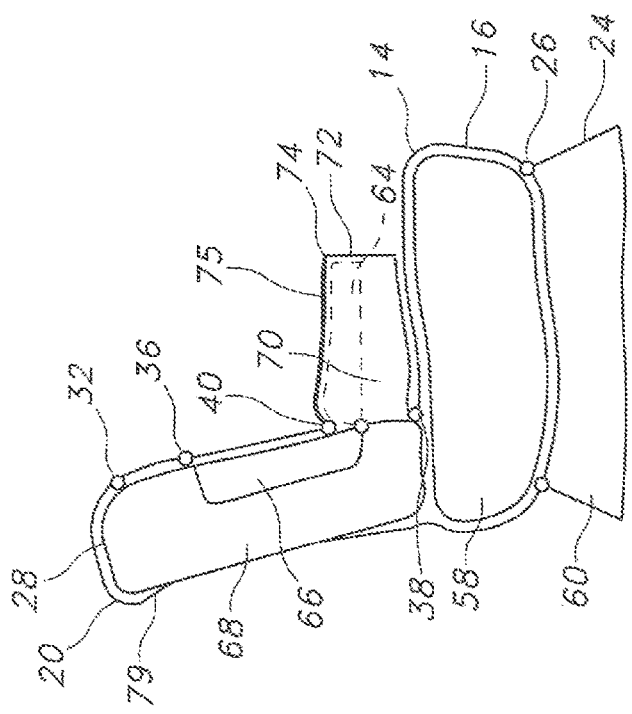
FIG. 11 is a cross-sectional view as in FIG. 10 with full armrest and stowable cover component deployment.
Figure 10:
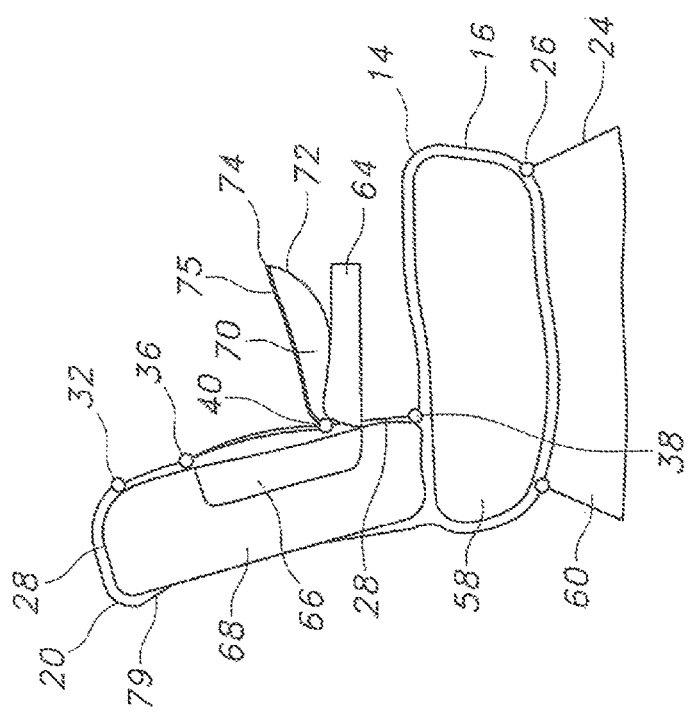
FIG. 10 is a cross-sectional view as in FIG. 9 showing full deployment of the armrest and partial deployment of the stowable cover component.

Taking the FIG. 1 cover 10, FIGS. 2-7 show the seat/cover combination 50 (seat cover 10 over the seat, in other words) in different stages of deployment of the armrest 64 from stowed within a recess 66 to extending over the sitting platform portion 14 with full coverage of the armrest 64 and the seat back portions 12, 16 and sitting platform portion 14 by the seat cover 10. The seat includes a seat back portion 52, seat back side portions 54, a sitting platform 56 (which may be a single bench or multiple separated seats connected as a single bench or seat, such as opposing seats with a middle seat portion to accommodate multiple passengers), sitting platform sides 58, a middle sitting platform area 62, a middle seat back portion 68 above an armrest 64 and an armrest recess 66. Thus, in FIG. 2 the cover 10 is placed over the seat 12, 14, 16, and the connectors 18, 20, 22 and attached as well to keep the cover 10 in place over such seat or bench areas and regions, as shown. The middle panel 28 is in full coverage status over the seat back middle portion 68, and the internal panel 30 therein the middle panel 28 is likewise in full coverage over the armrest 64 as stowed (and the stowable cover component 70 therein is also stowed). In this manner, the middle panel detachment connectors 32 are also potentially covered to prevent discomfort for any person seated against them when seated on the middle sitting platform area 62 and resting against the middle seat back portion 68 as well. Likewise, the internal panel detachment connections 36 are covered to provide comfort, with the stowable cover component 70 additionally folded and stowed to provide, if desired, a cushion-like area over the stowed armrest 64. In FIG. 3, the middle panel 28 has been detached through movement along opposing connection lines 32, thereby allowing the middle panel 28 to fold forward along the mid-line 38 thereof and lay, with the internal panel 30 as well, on the surface of the sitting platform middle portion 62. In FIG. 4, the armrest 64 is then deployed outwardly by folding downward away from the recess 66 until it reaches full extension (such as at a detent) to reside within a plane above the sitting platform portion 62 of the seat or bench. In FIG. 5, the middle panel 28 is returned to its original connected (attached) state and the internal panel opening 40 is disengaged to allow for the deployed armrest 64 to extend through the middle panel 28 and internal panel 30 composite. In this manner, a portion of the middle panel 28 present below the armrest 64 itself also folds back to cover the area of the seat back middle portion 68 (in order to provide complete coverage, as noted throughout). In FIG. 6, the internal panel 30 is then detached in relation to the opposing lines 36 upward to permit the internal panel 30 to form a movable flap that opens upwardly and outwardly from the middle panel 28. Such a maneuver thus allows for access to a stowed cover component 70 underneath the internal panel 30 (opposite the exterior). The stowed cover component 70 thus itself begins to unfold from underneath the internal panel flap 30 and outwardly therefrom as well. A further fold of the stowed (stowable) cover component 72 is provided and shown in full deployment status within FIG. 7 such that the entirety of the armrest 64 (top surface and sides) are covered by the unfolded stowable cover component 72, with surface 75 and front 74 coverage provided thereby, as well as coverage (from spills, pet hair, etc., without limitation) of any uncovered portions of the sitting platform middle portion 62 underneath the armrest 64 as well. With the middle panel 28 returned to connected status, and the internal panel 30 likewise returned to connected status, in terms of the opposing detachment lines 32, 36 thereof, full coverage of the entire seat back portion 52, 62, the sitting platform portion 56 62, and sitting platform sides 58, the armrest 64, the armrest recess 66, and the middle seat back portion 68 (as well as, again, the area beneath the armrest 64) are all fully covered with a single piece cover 10 (leaving, at least in this potential embodiment, only the seat back sides 54 and vehicle floor 60 in the area of the seat or bench uncovered).

FIGS. 8-11 show a cross-sectional view of the same action taken in FIGS. 2-7 (along line A-A' of FIG. 2). These views provide a different perspective of the overall cover and method of use (deployment) in relation to a middle seat back portion armrest 64 for full coverage of the armrest 64 and seat in their entirety. Mirroring the procedure outlined in FIGS. 2-7 above, this perspective shows the outward deployment of the armrest 64 through the middle panel 28 and internal panel 30, and particularly the internal panel opening 40, to allow for such egress that the middle panel 28 may then return to its original status covering the middle seat back 68 and, with the internal panel 30 in returned status, over the armrest recess 66, as well. The internal panel flap 30 then unfolds to allow further unfolding of the stowable cover component 70 to ultimately cover the armrest 64 and, in this embodiment, drape over the surface and all sides thereof for complete coverage. Such an armrest 64 cover capability has not been provided within the prior art or within the industry as the closest existing products either simply fold down the middle panel component leaving the middle seat back, armrest, and armrest recess exposed, or has a fitted cover that access the armrest from the bottom, leaving the top surface exposed during use. In this manner, however, the inventive cover and method of use allows for complete coverage through the utilization of properly provided components within a middle panel 28, to allow armrest 64 egress and then complete coverage thereof. Certainly, if desired, the seat cover 10 may be provided with the capability of removing and reattaching the middle panel 28 (which would include the internal panel 30, too), as long as such components still are provided for the other option outlined in FIGS. 2-11, at least as it should be broadly understood and interpreted.

It should be well understood that the term "armrest" herein may apply to a single platform as shown in FIGS. 2-11, above, or, alternatively, may also encompass two or more separate and individually operated armrests along the back seat or bench, ostensibly to permit individual users access to narrow armrest components, rather than a shared type between two seated users. In such a situation, the inventive seat cover may be employed in the same fashion as above described, with one or both such individual armrests egressing from underneath the middle panel and through the internal panel with the stowable cover component operated in the same manner over one or both armrests, as well. In such seats, whether with individual and separate middle armrests or a single armrest (as in FIGS. 2-11), the seat or bench may include armrests located near both opposing rear vehicle doors to provide passengers the comfort of armrests on both sides of their body while seated. Such door-adjacent armrests may be movable and/or stowable, as well.

Certainly, although this is presented in relation to the embodiment described herein, it should be evident to the ordinarily skilled artisan that such an article and method of use is not limited to the specific descriptions provided herein. For example, the stowable cover component 70 may utilize a fitted cover portion to securely surround the armrest sides and surface. The essential consideration of this invention is thus presented in terms of such complete coverage of all portions of a seat or bench but with a cover that is also provided to entirely cover a seat without deployment of an armrest thereof. This versatility permits a user the ability to choose on demand how best to cover a target seat or bench, but with all the necessary components to do so within the structure of a single-piece article. The further cushioning effect of the stowable cover component 70 (for the armrest 64, etc.) is thus heretofore not provided in the art, nor, as a result, is the configuration of a middle panel 28 with an internal panel 30 for such stowable cover component 70 placement.

To remove the cover 10 from such a fully extended state (covering the seat and armrest 64 in total), the user need only take up the armrest cover portion (the stowable cover component 70) and fold back with preset creases into and behind the internal panel 30 as is it again detached along the connection lines 36. The middle panel 28 may then be detached and folded downward again along such lines 32 to allow for access to stowing capability of the armrest 64. The armrest 64 may then be returned to stowed state within the recess 66 through the opening 40 of the internal panel 30 while the detachment lines 36 are opened and the horizontal opening 40 is open as well. From there, the internal panel 30 may be restored to its original state (all connections and openings closed) and the middle panel 28 returned, again, to its own original state (connected detachment lines 32 at the top edge of the seat back middle portion 68). The cover connectors 18, 20, 22 may then be detached from the seat itself and the cover 10 removed and folded into transport form (not illustrated).

The cover 10 may further be provided with additional connectors, straps, etc., than what is shown in the figures herein. Additionally, if desired, flaps, pockets, pillows, other cushions, etc., may be incorporated therein or provided as add-on structures within the body of the cover, as well. The cover may be provided with adjustable belts, straps, etc., to modify the coverage size of a target seat or bench, too. As noted above, if desired, the stowable cover component may also be provided with either integrated cup holders that match the same within a target armrest, or extendible portions that allow for placement over such armrest cupholders and insertion of cups therein without stretching or harming the stowable cover component when in use. Such a stowable cover component may thus also be provided with a coating or suitable to facilitate cleaning if a spill occurs.

The entire cover may thus be machine washable or, otherwise, at least dry cleanable as needed. The overall cover may, as alluded to above, also be folded up appropriately for insertion within a tote or carrying case to facilitate transport and storage.

It should be noted that the vehicle seat cover has been shown and described as covering the rear seat of a motor vehicle. It should be understood that vehicle seat cover is versatile and multi-functional, and may be used to cover any suitable surface, such as a front seat or the cargo area of a sports utility vehicle, and may further be used in combination with any type of vehicle, or any surface which requires protection.

It is to be understood that the present invention is not limited to the embodiments described above, but encompasses any and all embodiments within the scope of the following claims.

The invention claimed is:

1. A vehicle seat cover comprising a flexible sheet to cover a full rear seat or bench of a vehicle, wherein said flexible sheet includes a top edge, a bottom edge, and two opposing side edges, and a mid-line running from one opposing side edge to another, wherein said mid-line defines a folding edge between a back portion and a sitting platform portion thereof said seat and or bench, said seat cover further including a middle portion, wherein said middle portion comprises a middle panel having opposing and parallel side edges as detachable structures with connectors located at least at said top edge of said seat cover and allowing for said panel to fold downward to lay, at least temporarily, on said sitting platform portion of said seat or bench, said middle panel including a separate internal panel having an exterior face, an internal portion, and an opening portion from one middle panel side edge to the opposing side edge and provided substantially horizontally between said middle panel side edges and at a location above that of said mid-line of said seat cover, wherein said internal panel further includes opposing and parallel detach lines leading from said opening portion upward to a set distance within said middle panel, said internal panel also further including a stowable cover component within said internal portion thereof, wherein said stowable cover component unfolds outwardly and from underneath said internal panel when said internal panel is detached from said middle panel in relation to said detach lines, wherein said stowable cover component extends from said internal panel such that said internal panel may be reattached through said detach lines to said middle panel and said middle panel may be reattached to said detachable structures to provide full coverage of said seat or bench when said stowable cover component is present external to said internal panel.

\* \* \* \* \*